Patented Nov. 18, 1930

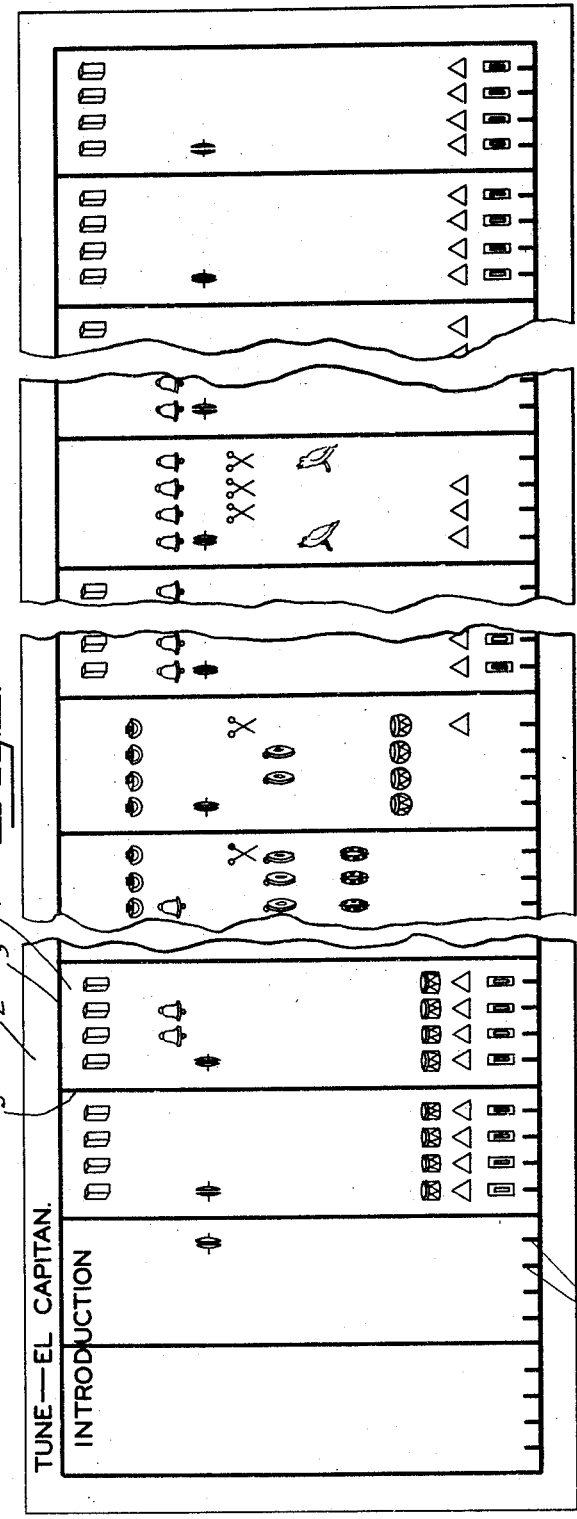

1,782,046

UNITED STATES PATENT OFFICE

MARY E. MAYBERRY, OF BURLINGAME, AND EDITH A. HILL, OF SAN FRANCISCO, CALIFORNIA

RHYTHMIC CHART FOR CHILD ORCHESTRATION

Application filed November 5, 1927. Serial No. 231,279.

This invention relates to musical instruction generally and has as its object an improved method and charts for child instruction in orchestration.

Briefly described the method comprises the use by children of certain simple musical instruments and tap or rhythm sticks in connection with a special chart while a certain piece is played on any leading or guiding instrument such as a piano or phonograph, the chart being prepared to suit the particular piece played.

The method does not teach a child how to play the piece, but only the rhythm of the piece as it is intended for the use of very young children, as the piece itself is not played from the chart.

The drawings hereto show in Fig. 1 portions of a chart as prepared for use with a certain piece of music, in this case "El Capitan," while in Fig. 2 is shown a portion of the direction sheet picturing the instruments to be used and as they appear on the chart.

The instruments used by the children in our rhythmic method of child orchestration comprise bells, bird-whistles, triangles, cymbals, xylophones, gongs, tambourines, drums, castanets, sand blocks, Chinese wood blocks and tom-toms, all as clearly shown on the direction sheet 1 of Fig. 2, and in addition to these some of the children are provided with rhythm sticks for marking the time.

The pictures of the instruments appearing on the direction sheet and chart are reduced to simplest form so as to provide easily recognizable symbols, hence require no designating numerals in this application.

The chart 2 (Fig. 1) comprises a long sheet of paper, usually about six feet long, inscribed with a frame 3 divided into small vertical panels 4 by vertical lines 5 corresponding to the bars of the piece of music for which the chart is plotted, while between the lines 5 are shorter lines 6 representing the beats or time of each measure.

Any number of sheets may be used to chart a given piece of music, depending on the length of the piece.

At the head of each sheet is the title of the piece as in the present instance "El Capitan" and within each panel are printed or impressed duplicates of the instruments or symbols as shown on the direction sheet.

These impressions of the various symbols are preferably each in a distinctive color so that a child with one of the instruments will be guided first by color and then by form to the proper symbol, and the various symbols impressed are vertically in line with the beat mark 6 at which their sound is wanted, while a certain vertical position on the chart is, so far as is practicable, preferably reserved for each symbol used in a given piece so that a child will only be required to follow one horizontal row, there being no varying pitch value involved in this system.

Having the chart thus prepared for a given piece of music, the chart is hung up horizontally on the wall with children equipped with their instruments massed before it, and a performer on a piano or other instrument, or a phonograph, plays the actual piece of music, the children with the rhythm sticks marking the time as designated by the vertical lines 6 and each child operating its particular instrument when its symbol appears directly above said lines 6 coincidentally with the tap of the rhythm sticks.

In this manner it has been found possible to quickly teach the rhythm of any piece of music to large groups of very young children in kindergarten so that as they take up music later on a thorough foundation in rhythmic time will have been inculcated.

From what has been disclosed it will be apparent that other symbols and instruments may also be used, and that a piece of music may be rhythmically charted to include but one or two for the first instruction, or may include any or all of the instruments in a single chart.

We claim:

1. As an article of manufacture a rhythmic chart comprising an elongated sheet inscribed with spaced marks designating measures of a piece of music, said measures uniformly graduated with spaced sub-marks designating the beats of the measures, and aligned with said sub-marks a series of symbols of various sound instruments.

2. As an article of manufacture a rhythmic chart comprising a horizontally arranged panel subdivided vertically into smaller panels corresponding to the measures of a piece of music and said smaller panels uniformly subdivided by marks spaced along a horizontal side of the panels corresponding to the time beats of the piece.

3. As an article of manufacture a rhythmic chart comprising a horizontally arranged panel subdivided vertically into smaller panels corresponding to the measures of a piece of music, said smaller panels uniformly subdivided by marks spaced along a horizontal side of the panels corresponding to the time beats of the piece, and symbols of various sound instruments vertically aligned over said spaced marks.

4. As an article of manufacture a rhythmic chart comprising a horizontally arranged panel subdivided vertically into smaller panels corresponding to the measures of a piece of music, said smaller panels subdivided by spaced marks corresponding to the time beats of the piece, and symbols of various sound instruments vertically aligned over said spaced marks arranged with like symbols in horizontal rows.

5. As an article of manufacture a rhythmic chart comprising a horizontally arranged panel subdivided vertically into smaller panels corresponding to the measures of a piece of music, said smaller panels subdivided by spaced marks corresponding to the time beats of the piece, and symbols of various sound instruments vertically aligned over said spaced marks arranged with like symbols in horizontal rows, and the rows colored to distinguish from one another.

MARY E. MAYBERRY.
EDITH A. HILL.